(12) United States Patent
Shah et al.

(10) Patent No.: US 11,474,907 B2
(45) Date of Patent: Oct. 18, 2022

(54) APPARATUS, METHOD, AND PROGRAM PRODUCT FOR CLUSTER CONFIGURATION DATA BACKUP AND RECOVERY

(71) Applicant: International Business Machines Corporation, Armonk, NY (US)

(72) Inventors: Komal S. Shah, Pune (IN); Shweta Kulkarni, Gangapur Road (IN); Bharti Soni, Jaipur (IN); Shrirang S. Bhagwat, Pune (IN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 16/052,314

(22) Filed: Aug. 1, 2018

(65) Prior Publication Data
US 2020/0042403 A1    Feb. 6, 2020

(51) Int. Cl.
*G06F 11/14* (2006.01)
*G06F 8/30* (2018.01)
*G06F 9/445* (2018.01)
*H04L 9/40* (2022.01)

(52) U.S. Cl.
CPC ............ *G06F 11/1464* (2013.01); *G06F 8/30* (2013.01); *G06F 9/44505* (2013.01); *G06F 11/1469* (2013.01); *H04L 63/08* (2013.01); *G06F 2201/80* (2013.01)

(58) Field of Classification Search
CPC .... G06F 8/30; G06F 9/44505; G06F 11/1469; G06F 2201/80; G06F 11/1464; H04L 63/08

USPC .................................................. 707/652, 662
See application file for complete search history.

(56) References Cited

U.S. PATENT DOCUMENTS

| | | | |
|---|---|---|---|
| 7,392,421 B1 | 6/2008 | Bloomstein et al. | |
| 7,941,501 B2* | 5/2011 | McCabe | G06F 11/2058 709/217 |
| 8,806,567 B1* | 8/2014 | Venable, Sr. | H04L 63/0823 726/1 |
| 8,954,786 B2* | 2/2015 | Mordani | G06F 11/2041 714/4.12 |
| 2012/0158919 A1* | 6/2012 | Aggarwal | H04L 63/104 709/220 |
| 2013/0085999 A1* | 4/2013 | Tung | G06F 11/1451 707/654 |
| 2013/0238554 A1* | 9/2013 | Yucel | G06F 11/1415 707/610 |
| 2013/0261804 A1* | 10/2013 | Casilli | G05B 15/02 700/276 |
| 2013/0262638 A1* | 10/2013 | Kumarasamy | H04L 67/34 709/221 |

(Continued)

*Primary Examiner* — Syed H Hasan
*Assistant Examiner* — Nicholas E Allen
(74) *Attorney, Agent, or Firm* — Kunzler Bean & Adamson

(57) ABSTRACT

Apparatuses, methods, systems, and program products are disclosed for cluster configuration backup and recovery. One method includes receiving, by use of a processor, configuration data for a cluster. The method includes storing the configuration data for the cluster. The method also includes forming a machine-readable code that corresponds to the stored configuration data for the cluster. The machine-readable code may be used for restoring the stored configuration data to the cluster.

18 Claims, 8 Drawing Sheets

(56) References Cited

U.S. PATENT DOCUMENTS

| | | | |
|---|---|---|---|
| 2013/0268128 A1* | 10/2013 | Casilli | G05D 23/19 |
| | | | 700/276 |
| 2014/0034720 A1 | 2/2014 | Iyengar et al. | |
| 2014/0034721 A1* | 2/2014 | Gadepalli | G06F 11/006 |
| | | | 235/375 |
| 2014/0270682 A1* | 9/2014 | Carey | G06F 21/78 |
| | | | 386/223 |
| 2014/0335823 A1* | 11/2014 | Heredia | H04W 4/14 |
| | | | 455/411 |
| 2016/0085462 A1* | 3/2016 | Buzzard | G06F 3/0617 |
| | | | 711/162 |
| 2016/0085632 A1 | 3/2016 | Factor et al. | |
| 2016/0188426 A1* | 6/2016 | Kousha | G06F 16/00 |
| | | | 714/4.12 |
| 2017/0048215 A1* | 2/2017 | Straub | H04L 63/06 |
| 2017/0195318 A1* | 7/2017 | Liu | H04L 67/2809 |
| 2017/0272100 A1 | 9/2017 | Yanovsky et al. | |
| 2017/0336947 A1* | 11/2017 | Bliss | G06F 3/04842 |

\* cited by examiner

APPARATUS, METHOD, AND PROGRAM PRODUCT FOR CLUSTER CONFIGURATION DATA BACKUP AND RECOVERY

FIELD

The subject matter disclosed herein relates to cluster configurations and more particularly relates to cluster configuration data backup and recovery.

BACKGROUND

Cluster systems may have multiple computing nodes. Each computing node of the cluster system may have its own configuration.

BRIEF SUMMARY

An apparatus for cluster configuration backup is disclosed. A method and computer program product also perform the functions of the apparatus. In one embodiment, an apparatus includes a data collection module that receives configuration data for a cluster. The apparatus, in a further embodiment, includes a storage module that stores the configuration data for the cluster. In various embodiments, the apparatus includes a code generation module that forms a machine-readable code that corresponds to the stored configuration data for the cluster. In certain embodiments, at least a portion of the data collection module, the storage module, and the code generation module includes one or more of hardware and executable code. The executable code may be stored on one or more computer readable storage media.

A method for cluster configuration backup, in one embodiment, includes receiving, by use of a processor, configuration data for a cluster. In various embodiments, the method includes storing the configuration data for the cluster. The method may also include forming a machine-readable code that corresponds to the stored configuration data for the cluster.

In one embodiment, a computer program product for cluster configuration restoration includes a computer readable storage medium having program instructions embodied therewith. The program instructions, in some embodiments, are executable by a processor to cause the processor to transmit configuration data for a cluster to storage. The program instructions, in one embodiment, are executable by a processor to cause the processor to transmit a notification indicating that the cluster is inoperable. In a further embodiment, the program instructions are executable by a processor to cause the processor to receive a machine-readable code corresponding to the configuration data in response to transmitting the notification. In certain embodiments, the program instructions are executable by a processor to cause the processor to authenticate an administrator using authentication data from the machine-readable code. The program instructions, in various embodiments, are executable by a processor to cause the processor to restore the configuration data based on the machine-readable code.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
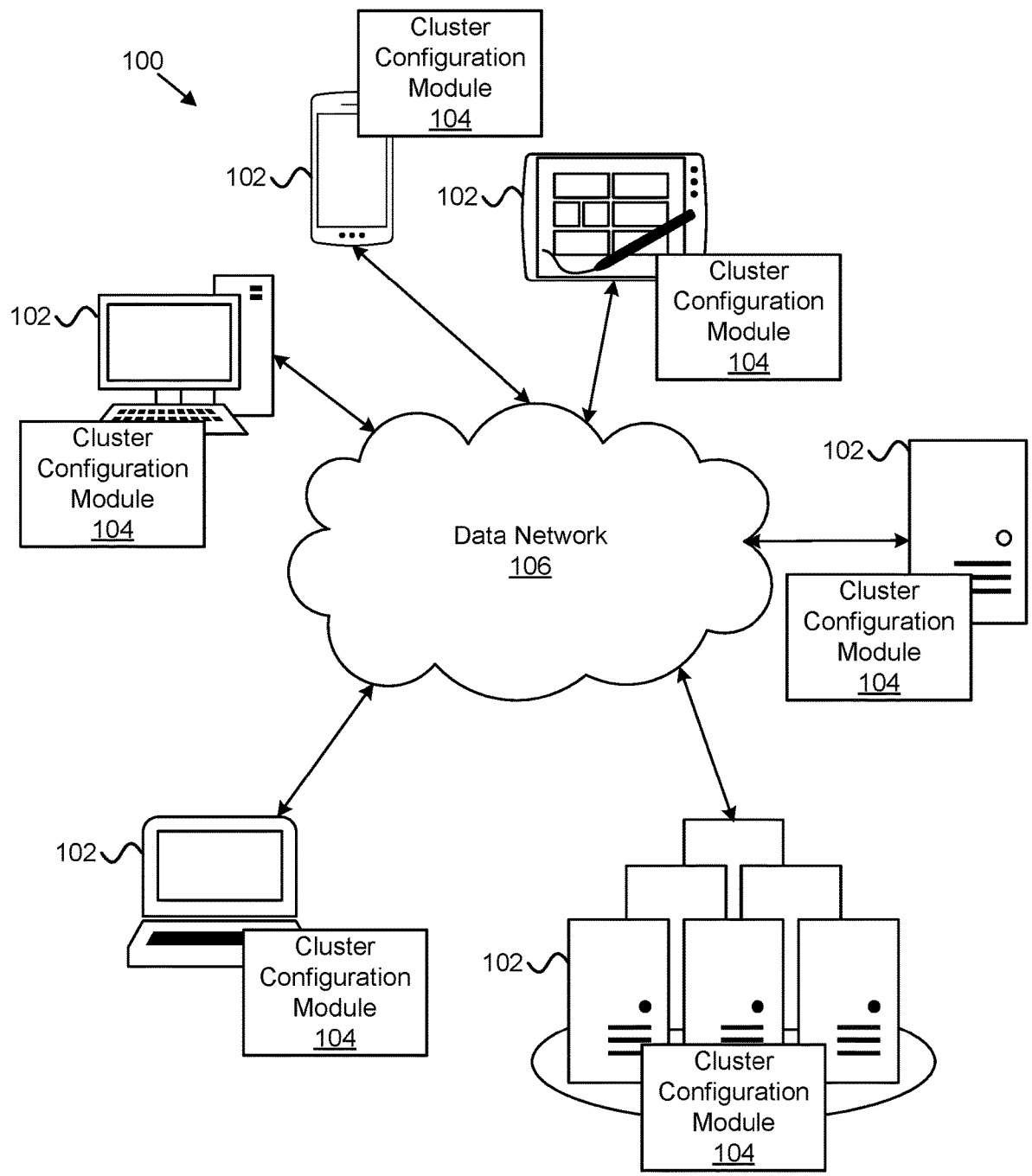
FIG. 1 is a schematic block diagram illustrating one embodiment of a system for cluster configuration data storage in accordance with one embodiment of the present disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for cluster configuration data storage. In one embodiment, the system 100 includes information handling devices 102, cluster configuration modules 104, and data networks 106. Even though a particular number of information handling devices 102, cluster configuration modules 104, and data networks 106 are depicted in the system 100 of FIG. 1, one of skill in the art will recognize that any number or configuration of information handling devices 102, cluster configuration modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous access to stored data. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, tape readers, or the like. In some embodiments, the information handling devices 102 are in communication via one or more data networks 106, described below.

In one embodiment, the cluster configuration module 104 receives configuration data for a cluster. The cluster configuration module 104 may store the configuration data for the cluster. The cluster configuration module 104 forms a machine-readable code that corresponds to the stored configuration data for the cluster. In this manner, the cluster configuration module 104 may facilitate creating a unique machine-readable code for a particular storage of configuration data. Ultimately, this may facilitate providing faster restoration of configuration data in response to a cluster becoming inoperable.

As may be appreciated, the cluster configuration module 104 may be used in any suitable cluster system 100. In certain embodiments, as described below with reference to FIGS. 2, 3, and 6, the cluster configuration module 104 includes multiple modules that perform the operations of the cluster configuration module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
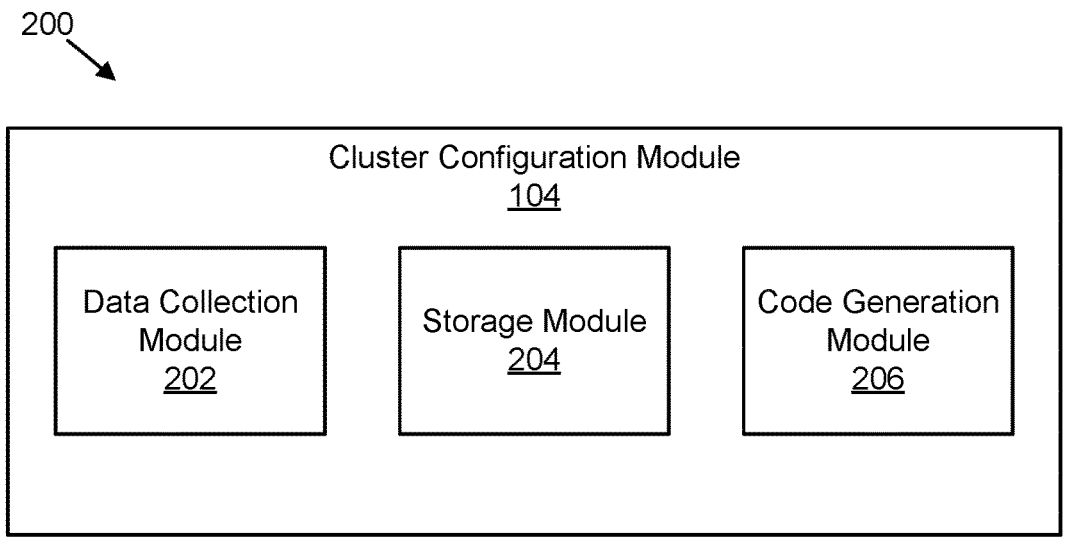
FIG. 2 is a schematic block diagram illustrating one embodiment of a module for cluster configuration in accordance with one embodiment of the present disclosure.

FIG. 2 is a schematic block diagram illustrating one embodiment of a module 200 for cluster configuration. In one embodiment, the module 200 includes an embodiment of a cluster configuration module 104. The cluster configuration module 104, in various embodiments, includes one or more of a data collection module 202, a storage module 204, and a code generation module 206, which are described in more detail below.

In one embodiment, the data collection module 202 receives configuration data for a cluster. In some embodiments, the cluster is a multi-node cluster. In various embodiments, the data collection module 202 may pull the configuration data from the cluster, while, in other embodiments, the cluster may push the configuration data to the data collection module 202. The data collection module 202 may receive configuration data for the cluster at various intervals to include various versions of the configuration data. For example, the data collection module 202 may receive configuration data for the cluster on a scheduled basis (e.g., hourly, daily, weekly, etc.). Moreover, the data collection module 202 may receive configuration data for the cluster after each change in configuration data for the cluster occurs. In certain embodiments, the data collection module 202 may receive configuration data for the cluster after a certain percentage of change in configuration data for the cluster occurs and/or after an amount of change in the configuration data exceeds a predetermined threshold. In some embodiments, the data collection module 202 may manually receive configuration data for the cluster, while, in other embodiments, the data collection module 202 may automatically (e.g., without human intervention, on an automated basis) receive configuration data for the cluster. The data collection module 202 may apply a timestamp (e.g., date and/or time) to the configuration data for the cluster.

The storage module 204, in one embodiment, stores the configuration data for the cluster. In some embodiments, the storage module 204 may store the configuration data for the cluster with a timestamp corresponding to the configuration data for the cluster. In certain embodiments, the storage module 204 may store configuration data for the cluster together in a group, but may store configuration data for individual nodes of a multi-node cluster separate and/or distinct from one another. In various embodiments, the storage module 204 may store configuration data indicating which individual nodes of a multi-node cluster form the multi-node cluster. In such embodiments, the configuration data for the individual nodes may be stored individually and/or may only be tied to the multi-node cluster by the configuration data indicating which individual nodes for the multi-node cluster. In some embodiments, each version of the stored configuration data may be tied to a particular storage location. The storage location may be a particular storage device, a particular real or virtual directory, a uniform resource locator ("URL"), and so forth. In one embodiment, a URL may be created that when accessed provides one version of stored configuration data for the cluster. The version of stored configuration data may be distinguished from other versions of the stored configuration data based on the URL, based on a corresponding timestamp, based on a version number, and/or based on a storage location of the configuration data.

The code generation module 206, in one embodiment, forms a machine-readable code that corresponds to the stored configuration data for the cluster. In certain embodiments, the machine-readable code is a quick response ("QR") code, a bar code, and/or an image code. In various embodiments, the machine-readable code may not be able to be deciphered by a human without a computer. For example, the machine-readable code may only be decoded by a computer. In some embodiments, the code generation module 206 may form the machine-readable code by: obtaining a storage location corresponding to the stored configuration data; determining a storage time corresponding to the stored configuration data; determining authentication data corresponding to an administrator of the cluster; and forming the machine-readable code based on the storage location, the storage time, and the authentication data. In certain embodiments, the storage location includes a URL, or some other identifier of a location that corresponds to the stored configuration data for the cluster. In some embodiments, the storage time includes a timestamp. In various embodiments, in place of the storage time may be an indicator of a version of the stored configuration data for the cluster. In some embodiments, the authentication data may be data used by an administrator of the cluster to access the stored configuration data for the cluster. For example, the authentication data may include a username and/or password for the administrator of the cluster.

In certain embodiments, at least a portion of the data collection module 202, the storage module 204, and the code generation module 206 include one or more of hardware and executable code. In such embodiments, the executable code may be stored on one or more computer readable storage media. As may be appreciated, the cluster configuration module 104 may facilitate formation of a unique machine-readable code to enable quick and/or error free restoration of the cluster to the configuration corresponding to the stored configuration data.

Figure 3:
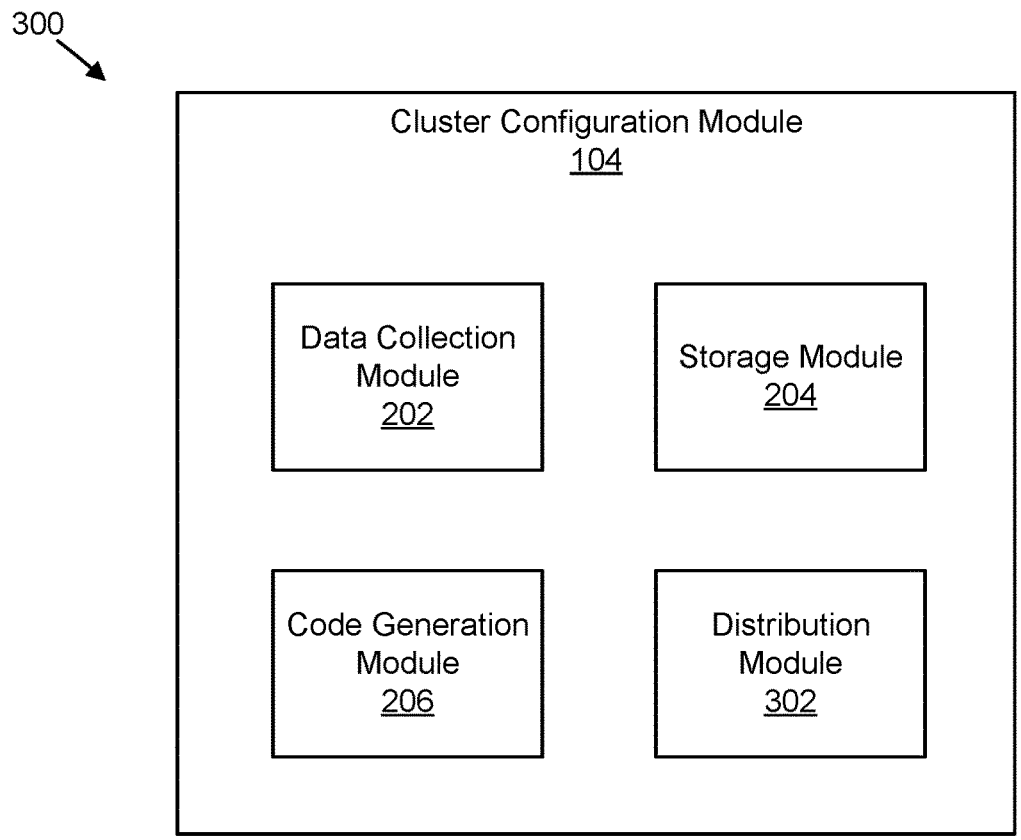
FIG. 3 is a schematic block diagram illustrating one embodiment of another module for cluster configuration in accordance with one embodiment of the present disclosure.

FIG. 3 is a schematic block diagram illustrating one embodiment of another module 300 for cluster configuration. In one embodiment, the module 300 includes an embodiment of a cluster configuration module 104. The cluster configuration module 104, in various embodiments, includes one or more of a data collection module 202, a storage module 204, and a code generation module 206, which may be substantially similar to the data collection module 202, the storage module 204, and the code generation module 206 described above. The cluster configuration module 104 may also include a distribution module 302, which is described in more detail below.

In one embodiment, the distribution module 302 provides the machine-readable code to an administrator of the cluster. In such embodiments, the machine-readable code may be used by the administrator to restore the configuration data to the cluster. For example, the administrator may provide the machine-readable code to the cluster to initiate restoring the configuration data to the cluster. In various embodiments, the distribution module 302 may receive a selection that selects the stored configuration data out of multiple versions of stored configuration data. The selection may be made by an administrator or user based on a version number, a time stamp, a storage date, a file size, and so forth. In some embodiments, the machine-readable code is formed in response to the selection that selects the stored configuration data. Accordingly, the machine-readable code may be a unique code that is specific only to the selected stored configuration data.

Figure 4:
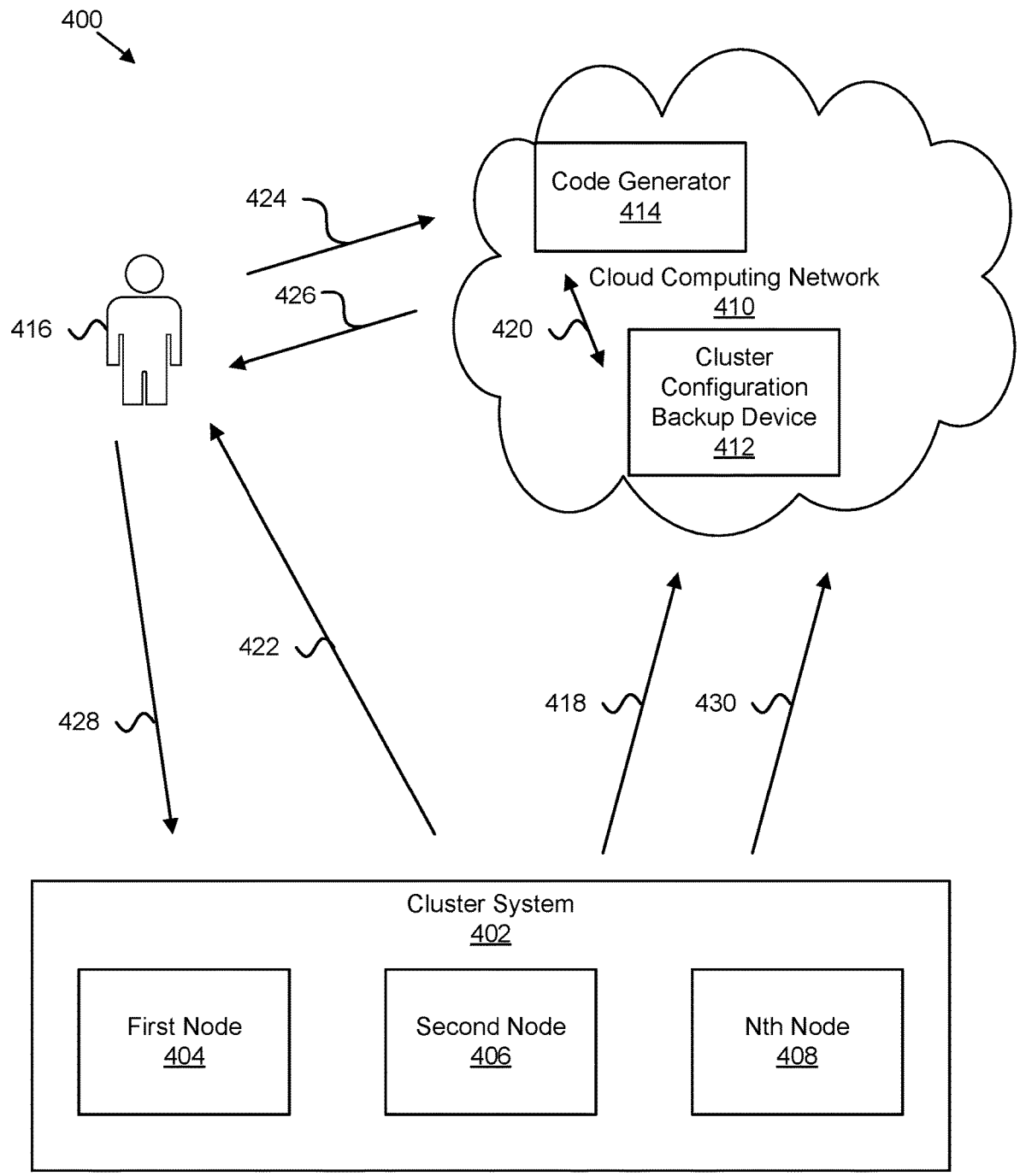
FIG. 4 is a schematic block diagram illustrating one embodiment of another system for cluster configuration data storage in accordance with one embodiment of the present disclosure.

FIG. 4 is a schematic block diagram illustrating one embodiment of another system 400 for cluster configuration data storage in accordance with one embodiment of the present disclosure. As illustrated, the system 400 includes a cluster system 402. The cluster system 402 may have any suitable number of individual nodes with it. In the illustrated embodiment, the cluster system 402 includes a first node 404, a second node 406, and an nth node 408. The nth node 408 represents any number of nodes up to "n." For example, "n" may be any suitable number from 0 to 100. Each of the first node 404, the second node 406, and the nth node 408 has a configuration corresponding to it. Together, all of the configurations for each of the nodes makes up the cluster system 402 configuration or cluster system 402 configuration data. The cluster system 402 configuration or cluster system 402 configuration data may be referred to herein as configuration data for a cluster.

The system 400 also includes a cloud computing network 410 which may be physically remote from the cluster system 402. The cloud computing network 410 may be any type of network that includes computers that can be used for processing data and/or storing data. The cloud computing network 410 includes a cluster configuration backup device 412 used to receive and/or store configuration data for the cluster system 402. The cloud computing network 410 also includes a code generator 414 used to generate machine-readable codes corresponding to stored configuration data. The system 400 also includes an administrator 416 (e.g., system administrator, user, etc.).

In some embodiments, the cluster system 402 provides 418 a copy of the cluster system 402 configuration data to the cluster configuration backup device 412. The cluster system 402 may provide 418 the copy of the cluster system 402 configuration data to the cluster configuration backup device 412 periodically as a scheduled task to facilitate recovery of the cluster system 402 in case the cluster system 402 becomes inoperable (e.g., all of the nodes of the cluster system 402 become inoperable). The scheduled task may be scheduled by the administrator 416. The scheduled task may run on a designated node of the cluster system (e.g., a master node in a system having a master-slave model, a slave node in a system having a master-slave model). In certain embodiments, the scheduled task may run based on periodic contributions from one or more nodes (e.g., all of the nodes) in the cluster system. In various embodiments, every time the scheduled task is run, a state of the cluster system 402 may be packaged and/or transferred to the cluster configuration backup device 412. In one embodiment, the cluster configuration backup device 412 may generate a unique storage location corresponding to each time the cluster configuration data is stored. The unique storage location may correspond to a specific version of the cluster configuration data that may have a corresponding timestamp. In various embodiments, the cluster configuration backup device 412 may generate a unique URL corresponding to the storage location at which the cluster configuration data is stored, each time that the cluster configuration data is stored.

In some embodiments, the code generator 414 may communicate 420 with the cluster configuration backup device 412. The code generator 414 may receive a storage location (e.g., URL) each time the cluster configuration data is stored and may generate a unique machine-readable code based on the storage location, a storage time (e.g., timestamp) corresponding to the stored cluster configuration data, the administrator's 416 authentication data (e.g., username and/or password), and/or other data. The machine-readable code may be any suitable machine-readable code, such as a QR code. The code generator 414 may generate the unique machine-readable code by encoding any inputs used to generate the unique machine-readable code.

In certain embodiments, the cluster system 402 may determine that each of the nodes of the cluster system 402 are no longer operable. The cluster system 402 may provide 422 an alert to the administrator 416 indicating that each of the nodes of the cluster system 402 are no longer operable. The alert may be provided to the administrator 416 using any suitable alerting system, such as an alerting system that uses an email, a phone call, a short message service ("SMS"), and so forth to provide the alert. The alerting system may be configured on the cluster system 402.

In some embodiments, in response to receiving the alert from the cluster system 402, the administrator 416 may access 424 the code generator 414. The administrator 416 may access 424 the code generator 414 using any suitable device, such as a desktop computer, a laptop computer, a tablet, a smartphone, and so forth. The code generator 414 may have the administrator 416 to be authenticated (e.g., login) before providing any information to the administrator 416.

The code generator 414 may provide 426 the administrator 416 with a list of storage locations (e.g., URLs) for each backup of the cluster configuration data and a timestamp corresponding to the storage locations. The administrator 416 may select one of the storage locations, and the code generator 414 may provide a machine-readable code corresponding to the selected storage location. In some embodiments, the machine-readable code may have already been generated by the code generator 414, and, in other embodiments, the machine-readable code may be generated in response to the administrator 416 selecting the storage location. The machine-readable code may include authentication data corresponding to the administrator 416 so that the machine-readable code, if decoded, may be used to access the cluster configuration data using the storage location and the administrator authentication.

The administrator 416 may provide 428 the machine-readable code to the cluster system 402. By the administrator 416 providing 428 the machine-readable code, the administrator 416 does not have to manually type in a specific URL for recovery. This may speed up recovery of the cluster system 402 and may reduce typographical errors that may result from the administrator 416 typing in the URL. This also enables the cluster system 402 to automatically update the cluster system 402 upon receiving the machine-readable code.

Moreover, the cluster system 402 may decode the machine-readable code, and access 430 the cluster configuration backup device 412 to initiate restoring the cluster configuration data using the storage location and administrator authentication decoded from the machine-readable code. The cluster system 402 may download the stored cluster configuration data and automatically trigger recovery of the cluster system 402 using the cluster configuration data (e.g., by applying the cluster configuration data to the nodes of the cluster system 402).

Figure 5:
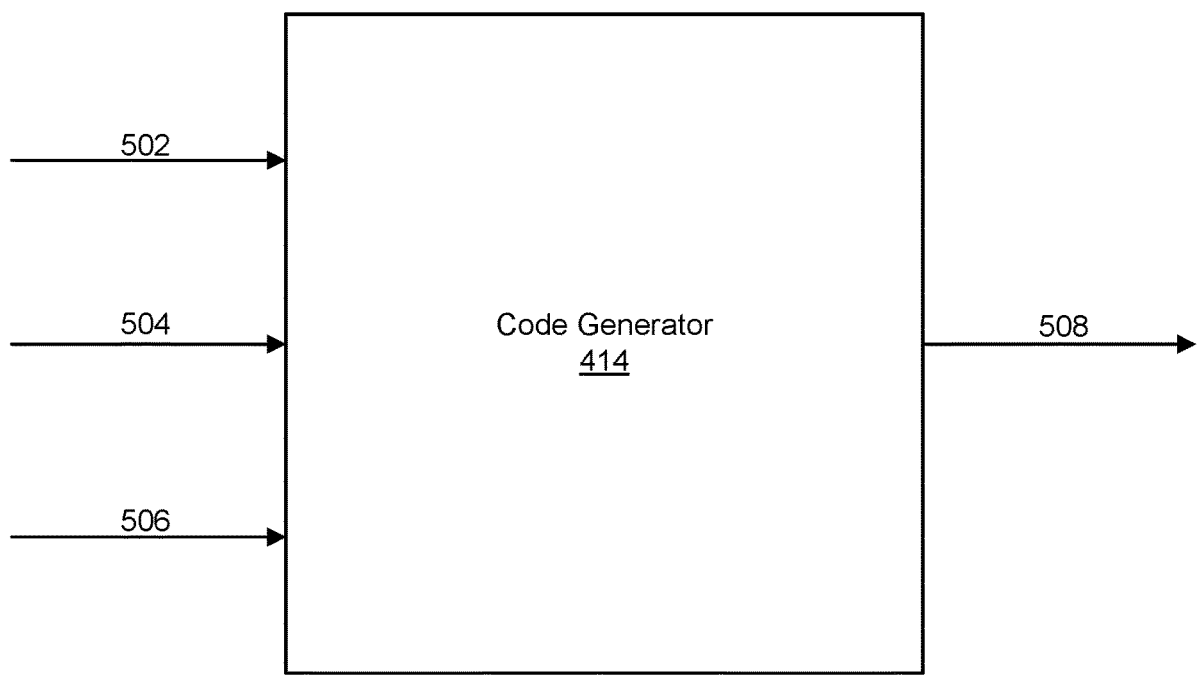
FIG. 5 is a schematic block diagram illustrating one embodiment of a code generator in accordance with one embodiment of the present disclosure.

FIG. 5 is a schematic block diagram illustrating one embodiment of the code generator 414 in accordance with one embodiment of the present disclosure. The code generator 414 may receive any suitable number of inputs for generating a code. In the illustrated embodiment, the code generator 414 receives a storage location 502, a storage time 504, and/or authentication data 506. Moreover, the code generator 414 uses the storage location 502, the storage time 504, and/or the authentication data 506 to produce a machine-readable code 508.

The storage location 502 may be any suitable storage location, such as a storage path, a storage device, a URL, a network path, and so forth. Moreover, the storage time 504 may be a timestamp, a date, a time, a sequence number, a version number, and so forth. The authentication data 506 may include a username and/or a password corresponding to an administrator (or another user). Furthermore, the machine-readable code 508 may be a QR code, a bar code, an image code, or some other code. By generating the machine-readable code 508, the code generator 414 may produce a code that includes everything needed by a cluster system to restore configuration data to the cluster system. With the machine-readable code 508 being read by machines, all data is combined into a single code that does not include typographical errors and is simple and easy to use.

Figure 6:
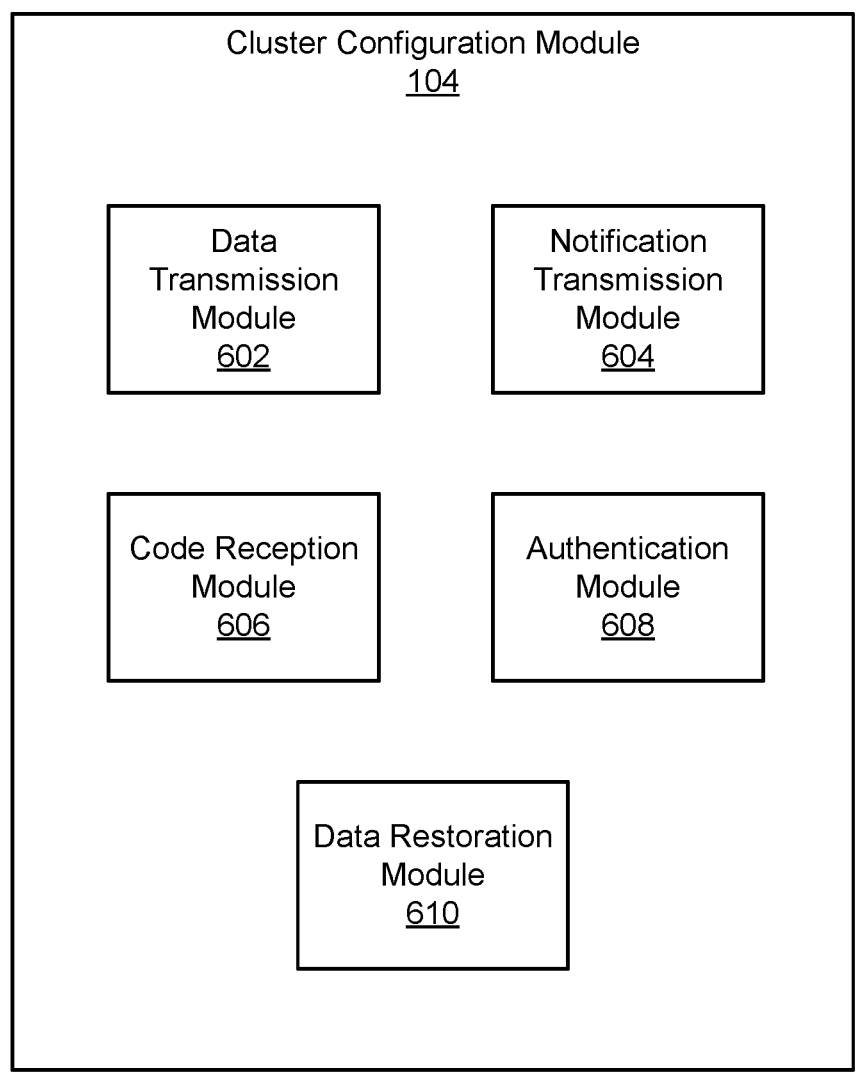
FIG. 6 is a schematic block diagram illustrating one embodiment of a further module for cluster configuration in accordance with one embodiment of the present disclosure.

FIG. 6 is a schematic block diagram illustrating one embodiment of a further module 600 for cluster configuration. In one embodiment, the module 600 includes an embodiment of a cluster configuration module 104. The cluster configuration module 104, in various embodiments, includes one or more of a data transmission module 602, a notification transmission module 604, a code reception module 606, an authentication module 608, and a data restoration module 610, which are described in more detail below. The cluster configuration module 104 may run and/or operate on a cluster system, such as the cluster system 402 of FIG. 4.

In one embodiment, the data transmission module 602 transmits configuration data for a cluster to storage (e.g., cloud storage). The configuration data may be transmitted on a scheduled basis, periodically, on demand, or using any suitable trigger for transmitting the configuration data. The configuration data may include all data used to restore the cluster in response to all nodes of the cluster becoming inoperable (e.g., not functioning properly).

The notification transmission module 604, in one embodiment, transmits a notification indicating that the cluster is inoperable. The notification may indicate that one or more nodes (or all nodes) are not functioning as they should and/or that the cluster needs to have its configuration data restored. The notification may be transmitted to an administrator using any suitable method of communication (e.g., email, phone call, text message, SMS, and so forth).

The code reception module 606, in one embodiment, receives a machine-readable code corresponding to the configuration data in response to transmitting the notification. In some embodiments, the machine-readable code may be a QR code, a bar code, an image code, or another code. In various embodiments, the code reception module 606 may be used to decode information from the machine-readable code. The information may include a storage location, a storage time, and/or authentication data. In some embodiments, the storage location includes a URL, or some other storage location identifier (e.g., a path name, an internet protocol "IP" address). In certain embodiments, the storage time includes a timestamp, a date, a time, a version, a sequence number, and so forth. In various embodiments, the authentication data includes authentication information (e.g., username, password, etc.) used to access the configuration data on the storage.

The authentication module 608, in certain embodiments, authenticates an administrator (or another user) using authentication data from the machine-readable code. In various embodiments, the data restoration module 610 restores the configuration data based on the machine-readable code. The data restoration module 610 may restore the configuration data by using the configuration data to configure the nodes of the cluster.

In certain embodiments, at least a portion of the data transmission module 602, the notification transmission module 604, the code reception module 606, the authentication module 608, and the data restoration module 610 include one or more of hardware and executable code. In such embodiments, the executable code may be stored on one or more computer readable storage media.

Figure 7:
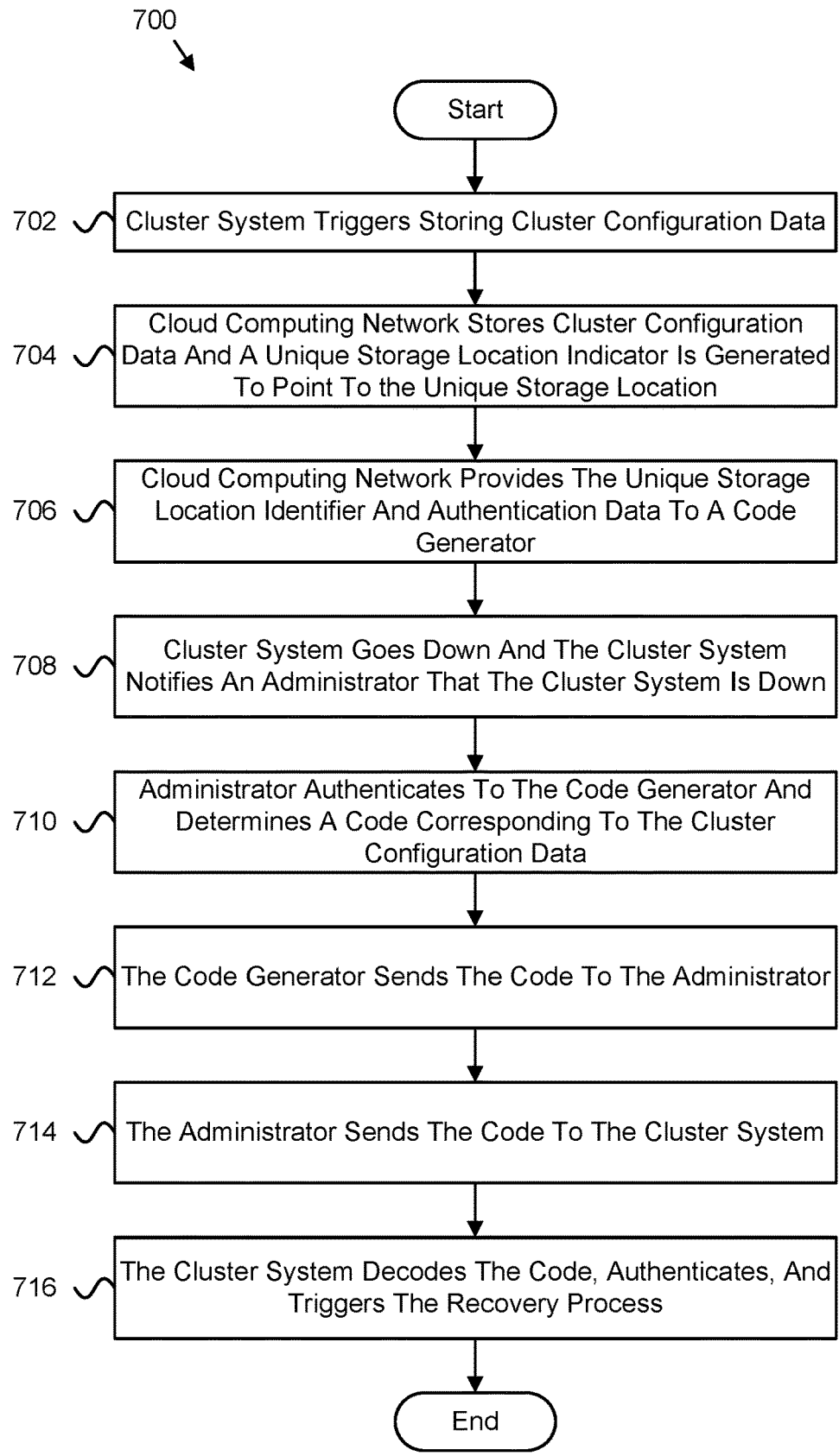
FIG. 7 is a schematic flow chart diagram illustrating one embodiment of a method for cluster configuration data storage in accordance with one embodiment of the present disclosure.

FIG. 7 is a schematic flow chart diagram illustrating one embodiment of a method 700 for cluster configuration data storage in accordance with one embodiment of the present disclosure. The method 700 may be one embodiment for operating the system illustrated in FIG. 4. Accordingly, devices illustrated in FIG. 4 are described in relation to the method 700.

In one embodiment, the method 700 begins and the cluster system 402 triggers 702 storing cluster configuration data. In some embodiments, the cloud computing network 410 stores 704 cluster configuration data and a unique storage location indicator is generated to point to the unique storage location.

In certain embodiments, the cloud computing network 410 provides 706 the unique storage location identifier to the code generator 414. In such embodiments, authentication data corresponding to the administrator 416 may be provided to the code generator 414. In various embodiments, the cluster system 402 goes down (e.g., does not operate properly) and the cluster system 402 notifies 708 the administrator 416 that the cluster system 402 is down.

In some embodiments, the administrator 416 authenticates 710 to the code generator 414 and determines a code (e.g., machine-readable code) corresponding to the cluster configuration data. For example, the administrator 416 may view a list of storage locations and may select one storage location, such as based on a storage time. The selected storage location may be used by the code generator 414 to generate the code. The code generator 414 sends 712 the code to the administrator 416.

The administrator 416 sends 714 the code to the cluster system 402. The administrator 416 may send 714 the code using any suitable manner, such as over a network, using a text message, and so forth. The cluster system 402 decodes 716 the code. From decoding 716 the code, the cluster system 402 may extract authentication information corresponding to the administrator 416 and a storage location for the cluster configuration data. The cluster system 402 may authenticate the administrator 416 to the cluster configuration backup device 412 using the authentication information extracted from the code. If authentication to the cluster configuration backup device 412 is not successful, access may be denied to the cluster system 402 and restoration of the cluster configuration data may be unsuccessful. If authentication to the cluster configuration backup device 412 is successful, the cluster configuration backup device 412 may access the storage location and provide the cluster configuration data to the cluster system 402. The cluster system 402 may restore the cluster configuration data to the cluster system 402 to make the cluster system 402 fully operational.

Figure 8:
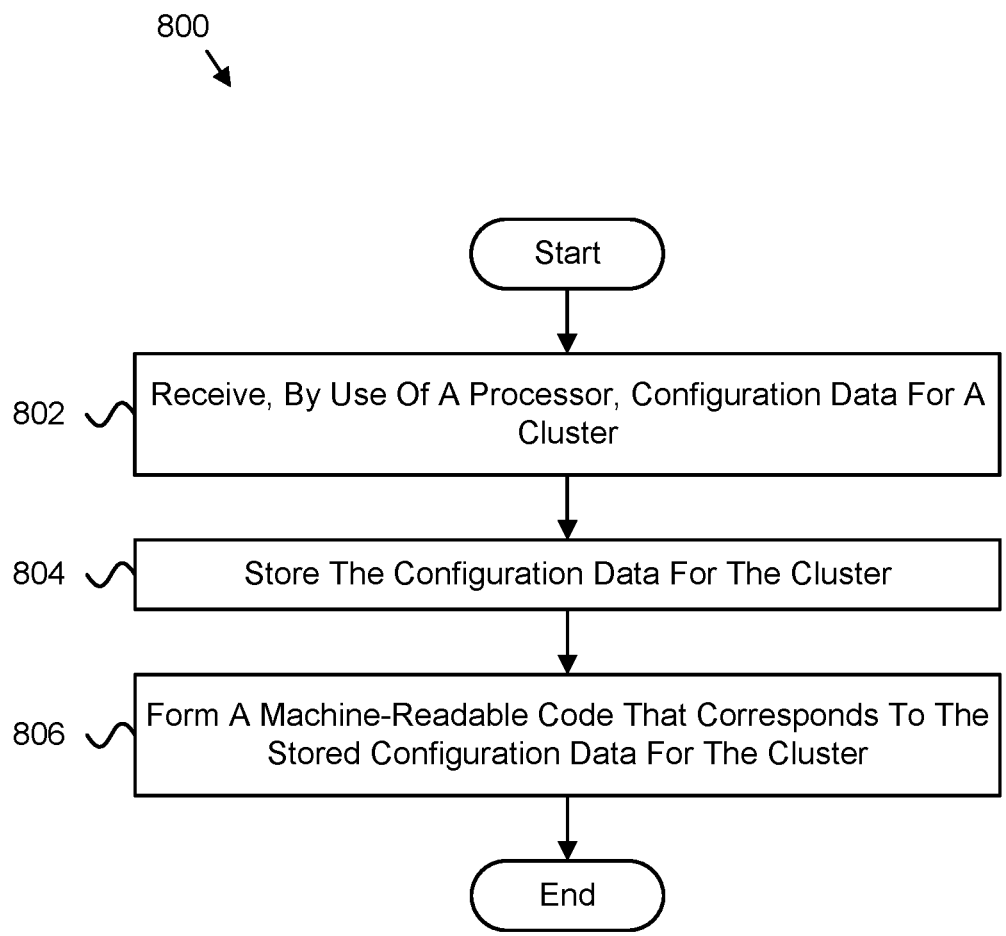
FIG. 8 is a schematic flow chart diagram illustrating one embodiment of another method for cluster configuration data storage in accordance with one embodiment of the present disclosure.

FIG. 8 is a schematic flow chart diagram illustrating one embodiment of another method 800 for cluster configuration data storage in accordance with one embodiment of the present disclosure.

In one embodiment, the method 800 begins and receives 802, by use of a processor, configuration data for a cluster. In some embodiments, the method 800 stores 804 the configuration data for the cluster. The method 800 also forms 806 a machine-readable code that corresponds to the stored configuration data for the cluster. In certain embodiments, forming 806 the machine-readable code includes: obtaining a storage location corresponding to the stored configuration data; determining a storage time corresponding to the stored configuration data; determining authentication data corresponding to an administrator of the cluster; and forming the machine-readable code based on the storage location, the storage time, and the authentication data. In some embodiments, the storage location includes a URL. In various embodiments, the storage time includes a timestamp.

In certain embodiments, the method 800 includes receiving a selection that selects the stored configuration data. In such embodiments, the machine-readable code is formed in response to the selection that selects the stored configuration data. In some embodiments, the method 800 includes providing the machine-readable code to an administrator of the cluster. In such embodiments, the machine-readable code is used to restore the configuration data to the cluster. In various embodiments, the machine-readable code is a QR code, a bar code, an image code, or another code. In certain embodiments, the cluster is a multi-node cluster.

Figure 9:
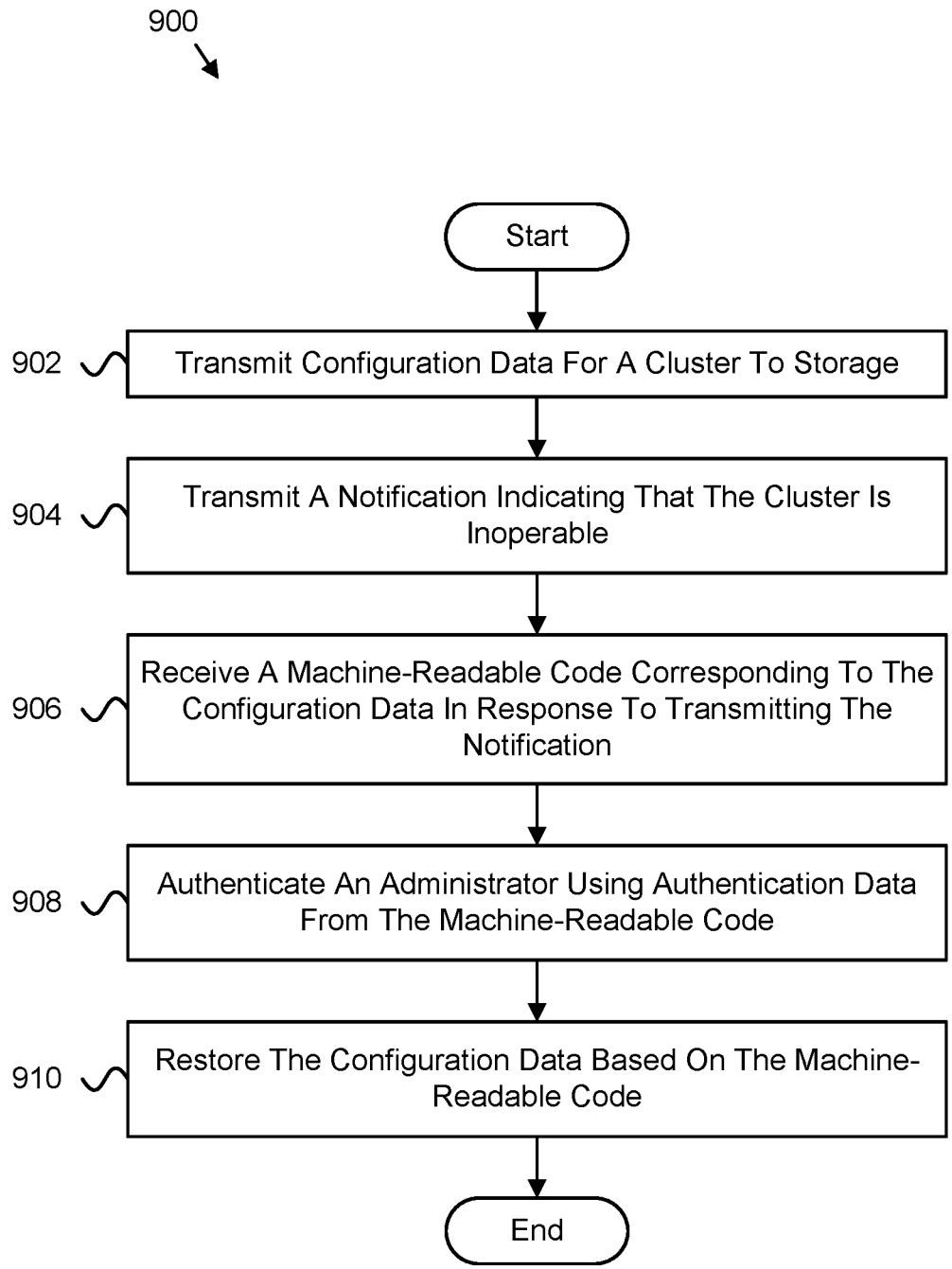
FIG. 9 is a schematic flow chart diagram illustrating one embodiment of a method for cluster configuration data restoration in accordance with one embodiment of the present disclosure.

FIG. 9 is a schematic flow chart diagram illustrating one embodiment of a method 900 for cluster configuration data restoration in accordance with one embodiment of the present disclosure.

In one embodiment, the method 900 begins and transmits 902 configuration data for a cluster to storage. In some embodiments, the method 900 transmits 904 a notification indicating that the cluster is inoperable. The method 900 also receives 906 a machine-readable code corresponding to the configuration data in response to transmitting the notification. In various embodiments, the method 900 authenticates 908 an administrator using authentication data from the machine-readable code. In certain embodiments, the method 900 restores 910 the configuration data based on the machine-readable code.

In certain embodiments, the method 900 decodes information from the machine-readable code after receiving 906 the machine-readable code. In such embodiments, the information may include a storage location, a storage time, and/or authentication data. In various embodiments, the storage location may include a URL. In some embodiments, the storage time may include a timestamp. In certain embodiments, the authentication data includes authentication information used to access the configuration data on the storage. In some embodiments, the machine-readable code is a QR code, a bar code, an image code, or another code.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for cluster configuration backup, comprising:
   a data collection module that automatically without human intervention receives configuration data for a cluster, wherein the cluster comprises a plurality of individual computing nodes, and the configuration data comprises configuration data for each individual computing node of the plurality of individual computing nodes;
   a storage module that stores the configuration data for the cluster, wherein the storage module stores multiple versions of the configuration data taken at different times;
   a code generation module that forms a machine-readable code that corresponds to the stored configuration data for the cluster, wherein the code generation module:
      obtains a storage location from a plurality of storage locations contained in the stored configuration data;
      determines a storage time from a plurality of storage times corresponding to the plurality of storage locations contained in the stored configuration data;
      determines authentication data corresponding to an administrator of the cluster and to the storage location; and
      forms the machine-readable code that indicates the storage location, the storage time, and the authentication data;
   a data restoration module that, in response to receiving information indicating the machine-readable code, restores the cluster using the configuration data to restore the configuration data to the same plurality of individual computing nodes;
   wherein at least a portion of the data collection module, the storage module, the code generation module, and the data restoration module comprises one or more of hardware and executable code, the executable code being stored on one or more non-transitory computer readable storage media.

2. The apparatus of claim 1, wherein the storage location comprises a uniform resource locator.

3. The apparatus of claim 1, wherein the storage time comprises a timestamp.

4. The apparatus of claim 1, further comprising a distribution module that provides the machine-readable code to an administrator of the cluster, wherein the machine-readable code is used to restore the configuration data to the cluster.

5. The apparatus of claim 1, wherein the data collection module and the code generation module are part of a cloud computing network.

6. A method for cluster configuration backup, comprising:
   receiving, by use of a processor automatically without human intervention, configuration data for a cluster, wherein the cluster comprises a plurality of individual computing nodes, and the configuration data comprises configuration data for each individual computing node of the plurality of individual computing nodes;
   storing the configuration data for the cluster, wherein the storage module stores multiple versions of the configuration data taken at different times;
   forming a machine-readable code that corresponds to the stored configuration data for the cluster, wherein forming the machine-readable code comprises:
      obtaining a storage location from a plurality of storage locations contained in the stored configuration data;
      determining a storage time from a plurality of storage times corresponding to the plurality of storage locations contained in the stored configuration data;
      determining authentication data corresponding to an administrator of the cluster and to the storage location; and
      forming the machine-readable code that indicates the storage location, the storage time, and the authentication data; and
   in response to receiving information indicating the machine-readable code, initiating restoring the cluster using the configuration data to restore the configuration data to the same plurality of individual computing nodes.

7. The method of claim 6, wherein the storage location comprises a uniform resource locator.

8. The method of claim 6, wherein the storage time comprises a timestamp.

9. The method of claim 6, further comprising receiving a selection that selects the stored configuration data, wherein the machine-readable code is formed in response to the selection that selects the stored configuration data.

10. The method of claim 6, further comprising providing the machine-readable code to an administrator of the cluster, wherein the machine-readable code is used to restore the configuration data to the cluster.

11. The method of claim 6, wherein the machine-readable code is a quick response code, a bar code, an image code, or some combination thereof.

12. The method of claim 6, wherein the cluster is a multi-node cluster.

13. A computer program product for cluster configuration restoration, the computer program product comprising a computer readable storage medium having program instructions embodied therewith, the program instructions executable by a processor to cause the processor to:
- transmit configuration data automatically without human intervention for a cluster to storage, wherein the cluster comprises a plurality of individual computing nodes, the configuration data comprises configuration data for each individual computing node of the plurality of individual computing nodes, and the storage stores multiple versions of the configuration data taken at different times;
- transmit a notification indicating that the cluster is inoperable;
- receive a machine-readable code corresponding to the configuration data in response to transmitting the notification, wherein the machine-readable code comprises:
  - a storage location from a plurality of storage locations contained in the configuration data;
  - a storage time from a plurality of storage times corresponding to the plurality of storage locations contained in the configuration data; and
  - authentication data corresponding to an administrator of the cluster and to the storage location;
- decode information from the machine-readable code, wherein the information comprises the storage location, the storage time, and the authentication data;
- authenticate an administrator using authentication data from the machine-readable code; and
- in response to receiving information indicating the machine readable code, restore the configuration data based on the machine-readable code to restore the configuration data to the same plurality of individual computing nodes.

14. The computer program product of claim 13, wherein the storage location comprises a uniform resource locator.

15. The computer program product of claim 13, wherein the storage time comprises a timestamp.

16. The computer program product of claim 13, wherein the authentication data comprises authentication information used to access the configuration data on the storage.

17. The computer program product of claim 13, wherein the machine-readable code is a quick response code, a bar code, an image code, or some combination thereof.

18. The method of claim 6, wherein a cloud computing network receives the configuration data and forms the machine-readable code.

* * * * *